Aug. 11, 1942.  E. E. SIMMONS, JR  2,292,549
MATERIAL TESTING APPARATUS
Filed Feb. 23, 1940  2 Sheets-Sheet 1

INVENTOR
EDWARD E. SIMMONS, JR.
BY
ATTORNEY

Aug. 11, 1942.  E. E. SIMMONS, JR  2,292,549
MATERIAL TESTING APPARATUS
Filed Feb. 23, 1940  2 Sheets-Sheet 2

INVENTOR
EDWARD E. SIMMONS, JR.
BY
ATTORNEY

Patented Aug. 11, 1942

2,292,549

UNITED STATES PATENT OFFICE 2,292,549

MATERIAL TESTING APPARATUS

Edward E. Simmons, Jr., Pasadena, Calif.

Application February 23, 1940, Serial No. 320,327

10 Claims. (Cl. 201—63)

This invention relates generally to materials testing apparatus and more particularly to strain gauges for determining the strain characteristics of a specimen or member, my invention being illustrated particularly in connection with impact testing although it will be understood that the invention has various applications in the mechanical and materials testing fields. The means for measuring impact values constitutes the subject matter of a divisional application Serial No. 425,913, filed January 7, 1942 while the present application is directed to my improved type of strain gauge per se.

While the improved combination of elements embodied in my strain gauge employs broadly the well-known principal that the electrical resistance of materials varies with the strain thereof, herein referred to as "electrical strain sensitivity," yet I have overcome in an improved manner the many objections that have been incident to certain prior art arrangements employing the principle.

It is one object of my invention to provide an improved electrical strain sensitive gauge that has a high degree of sensitivity, accuracy and responsiveness adapted to produce a maximum constancy of calibration in order to assure reproducible results and thereby minimize various defects arising from atmospheric influences as well as such defects as zero shifting and hysteresis.

A further object is to provide improved electrical strain sensitive means that has a high natural frequency whereby a uniform response is obtained to a given force, independent of the velocity of the application of the force within the limits of the working range.

A still further object is to provide an improved electrical strain sensitive apparatus that has a substantial linear calibration curve and is of low cost, simple construction, easy to apply to existing structures and is sturdy and durable under field conditions.

In the specific aspect of the invention I have discovered that the foregoing objects may be accomplished by securing the entire length of a very fine electrical strain sensitive metallic filament to the surface of a specimen or member, the securing means being any suitable cementing substance such as "Glyptal" adapted to harden when dried or baked so that the filament is accurately strained identically with the strain of the member during either static or dynamic tests in tension or compression or repetitive tests thereof. By this improved structure and mode of operation I find that I can overcome many, if not all, of the disadvantages of the prior electrical strain sensitive means while still retaining the advantages thereof as well as obtaining many additional advantages.

Other objects and advantages will be more apparent to those skilled in the art from the following description of the accompanying drawings in which.

Figure 1:
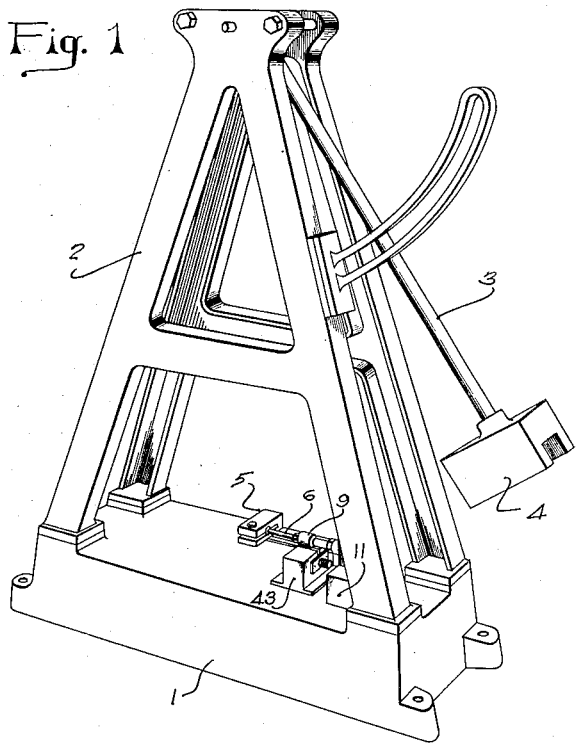
Fig. 1 is a perspective of an impact testing machine illustrating one application of my improved gauge.
Figure 3:
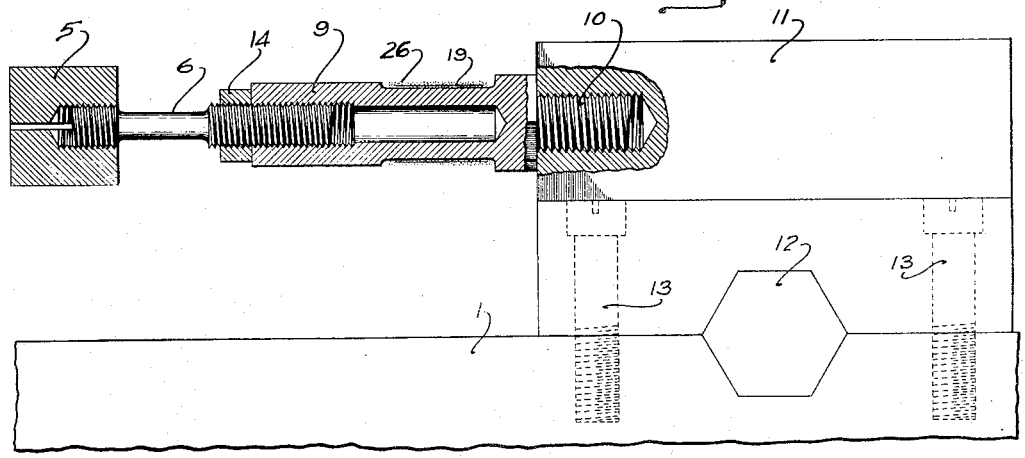
Fig. 3 is a partial vertical longitudinal section taken substantially on the line 3—3 of Fig. 2.

To illustrate one particular application of my improved gauge among possible others, I have diagrammatically shown in Fig. 1 a well-known type of impact testing machine having a base 1, a frame 2, and a pendulum 3 provided with a grooved weight 4 which is adapted in the usual and well-known manner to swing downwardly and engage a tup 5 secured to a specimen 6, Fig. 3, thereby to impart an impact load to the specimen. Heretofore the impact load has been measure in term of foot pounds of energy absorbed by the specimen, but the information gained by such a method is of limited value. By employing my improved electrical strain sensitive gauge I am able to determine the actual instantaneous stress in the specimen with a high degree of accuracy notwithstanding that the stress varies at an exceedingly high rate of speed.

To measure the impact stress, I provide a dynamometer bar or element 9, Fig. 3, preferably cylindrical and hollow and having a stem 10 threaded into a suitable base 11 which is adequately anchored to the main base 1 through a transverse key 12 and bolts 13. The other end of this element 9 is interiorly threaded to receive a threaded end of specimen 6 whose other threaded end is received in the tup 5. A lock nut 14 firmly holds the specimen in the dynamometer bar 9 so that the latter fully responds to the specimen load.

Figure 4:
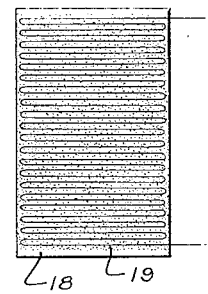
Fig. 4 is a preferred form of my gauge prior to being affixed to the test member or dynamometer.
Figure 6:
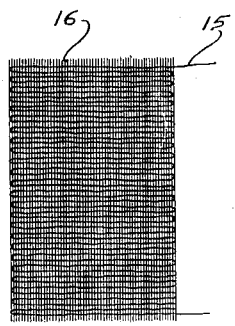
Fig. 6 is a plan view of a modified form of gauge in which a strain sensitive wire is woven in a mat form.

To determine the strain in the dynamometer element 9, I employ my improved strain sensitive electrical means consisting of a filament of very fine metallic wire 19, Fig. 4, that is continuous and solid throughout its length and whose electrical strain characteristics are predetermined. This wire may be of suitable and well-known material such as "Constantan," "Advance" and various other well-known materials having good resistance properties as well as being capable of fabrication in small wire sizes. The composition of such materials is will known and may be obtained from usual hand books on this subject. For example, "Advance" is a copper nickel alloy having generally 45% nickel and 55% copper. Also the strain sensitivity of various materials may be obtained from standard tables on this subject or readily determined by experiment. Hence it is not deemed necessary to describe such compositions or characteristics in detail herein as they are well-known. In certain work I have actually used a wire such as No. 40 gauge, approximately .0031 inch in diameter, such wire filament being preferably round although other shapes may be employed. In one instance I formed this wire filament into a mat as shown in Fig. 6 wherein the filament 15 is woven as the weft with fine silk threads 16 as the warp. These silk threads are sufficiently fine to permit the wire filament to lie substantially on a common surface, although as shown in Fig. 6 the wire filament is not drawn taut and hence the filament has a slight waviness. This mat is wrapped around and secured to the surface of the dynamometer element 9 to form a completely unitary part thereof with the filament strands each extending in a direction axially of the member 9. The member 9 is first covered with a suitable bonding material such as "Glyptal" and the mat placed thereon and thoroughly dried as by baking over a period of several hours, if necessary, whereby each infinitesimal portion of the filament is strained identically with the member 9 without any detectable creepage even though repeated applications of stress in either tension or compression are applied. Any waviness of the filament is apparently compensated by the continuous and infinitesimal securing of the filament to the specimen surface, the securing means apparently laterally supporting the filament so that its electrical strain sensitive characteristics have the same response as though the filament were straight. The "Glyptal" or other securing means is an electrical insulator.

Figure 5:
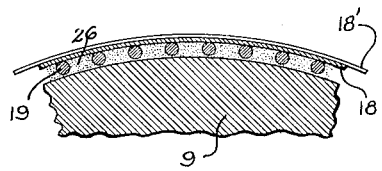
Fig. 5 is a greatly enlarged transverse section through a fragmentary portion of the dynamometer taken substantially on the line 5—5 of Fig. 2.

A second form of filament arrangement (Fig. 4) employs a membrane preferably in the form of a piece of thin paper 18 with the filament 19 wound back and forth as shown and secured thereto by "Glyptal" 26, Fig. 5, or other suitable adhesive insulating material, the filament being embedded in the cement 26 as shown in Fig. 5. In this arrangement the filament is slightly taut, this being accomplished by providing a suitable winding jig which does not constitute a part of my present invention and hence need not be described. The strain sensitive filament is wound back and forth across a thin paper 18, the strands of the filament being placed very close together but without touching each other. After the filament is wound to the desired extent it is covered with "Glyptal" which is then thoroughly dried and hardened so that the filament and paper form a gauge unit with the filament lying in the common plane of the paper surface. "Glyptal" is now placed on the surface of member 9 and the gauge unit is wrapped around the same with the filament strands 19 running in a direction axially of the member, it being desired to measure the axial strain of said member. As shown in Fig. 5, the paper 18 is located on the outside of the filament, but the filaments are suitably insulated from the member 9 by a small amount of "Glyptal" 26 that is initially placed on the member surface. If desired, the paper may be on the inside next to the surface of the member or specimen to be loaded. The filament and paper unit are held in position on member 9 by a suitable wrapping of thread 18'. Thereupon the "Glyptal" is thoroughly dried and hardened.

In the gauges of Figs. 4 and 6 the filament is wound back and forth in parallel lengths whose alternate ends are connected together so that the resistance of the successive parallel lengths accumulates in series. Also the filament and its supporting medium, such as the paper 18 and cement, form a unit adapted in turn to be bonded to the test body throughout the length of the filament in the same manner as though the filament were cemented directly to the body.

Figure 8:
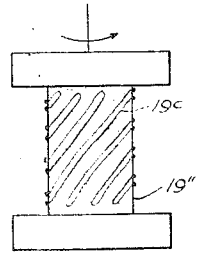
Fig. 8 is a torsion member with reversely extending adjacent filament sections to minimize inductive effects.

In a further filament arrangement used in making a dynamometer for torsional forces, Fig. 8, a filament strand 19c is wound directly on the cylindrical surface of a dynamometer member 19'' in 45 degrees diagonal direction and cemented in place. Insulation is obtained through the use of insulated wire and precoating of the dynamometer surface with a thin insulating layer. Reduction of the undesirable inductance of the winding may be secured by winding the filament 19c as a double strand. The filament can, of course, be applied directly to the dynamometer bar by hand winding and cementing.

Figure 7:
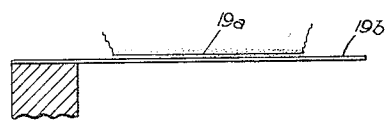
Fig. 7 is a flexure or bending plate having my strain sensitive filament applied thereto.

In the development of my invention, an initial test of the filament dynamometer was made, Fig. 7, with a cotton insulated strand 19a cemented to a flat piece of flexible steel 19b and tested by bending. In general, it is found that the dynamometers are more or less responsive to all modes of force application, although the sensitivity may be different. The dynamometer 9 of Fig. 3 has been found to be equally responsive to tension and compression loads, while due to the disposition of the winding completely around the bar, bending sensitivity is much reduced.

In the design of filaments for various uses, the variables of length, wire size and winding pitch are determined by the available space, the nature of the strain in the winding area and the heat dissipation possibilities. Except in extreme forms, the filament sensitivity is not affected by the geometry of the winding. In all forms the per cent change in resistance per unit elongation is practically constant. Of course, the application of force to a member does not result in a constant unit elongation in all directions for a constant unit force. This makes for different dynamometer sensitivities as pointed out under the discussion of dynamometer forms.

In general, it can be said that the sensitivity of the filament is directly proportional to the square root of the permissible electric power dissipation of the filament. In addition the sensitivity of a filament when used to operate a voltage sensitive apparatus varies directly as the square root of the filament resistance. Thus it is seen that good heat dissipation and high filament resistance make for high sensitivity. On the other hand, high resistance filaments require high voltage sources for operation and in high speed applications the high impedance of the filament may result in high frequency component losses of considerable magnitude due to capacitive shunting in the filament and associated circuits.

The choice of wire size is principally limited by the relative stiffness of the wire and the surrounding bonding material. Small diameter wire is the preferable choice because it gives a high resistance per unit of length and has the further cooperative function of presenting a tremendous bonding area compared to its cross-sectional area or strength, although commercial availability of small wires and the difficulties accompanying the use of fine wires set a practical limit at about 0.001 inch diameter. Constantan has proven to be a very desirable material for filaments.

The choice of length, pitch and diameter of the wire forming a filament is of course also connected with heat dissipation and desired winding resistance. As far as arrangement of the winding, it can be said that a winding with the filament disposed in the direction of the strain for the greatest per cent of its length is the best one. Thus a short reversibly extending winding is not believed to be as good as a longer one, because the ends contribute no strain sensitivity but add to the winding resistance. Pitch is controlled principally by constructional limitations and should be at least several wire diameters in order to allow better stress distribution in the bonding cement.

Figure 2:
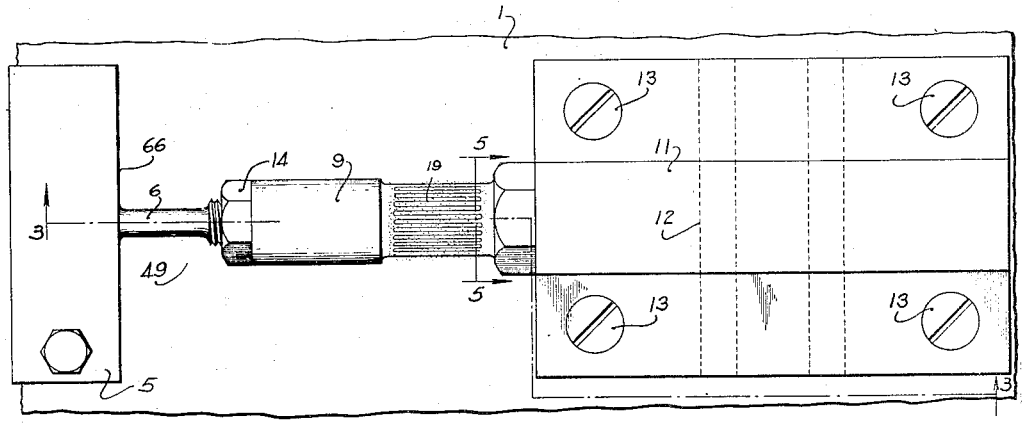
Fig. 2 is a plan view of the dynamometer portion of the impact machine and showing my improved gauge on a large scale.

The resistance of dynamometers constructed has varied from 17 ohms for an experimental bending dynamometer to 10,000 ohms for a quartz bulb pressure gauge. A tension dynamometer used in tests and illustrated in Figs. 2 and 3 has a filament resistance of 910 ohms wound with 0.003 inch diameter Constantan wire. This winding is of the reversibly extending type with each strand one and one-eighth inches long and containing about 34 feet of wire disposed uniformly about an 1¼ inch diameter cylindrical bar. The cylindrical type winding of the quartz gauge mentioned above has an approximate resistance of 10,000 ohms and consists of about 34 feet of 0.001 inch diameter Advance wire wound in a helix around a 1⅜ inch diameter bulb for a distance of about one inch. A full load resistance change of about 0.3 per cent is obtained in most designs.

To determine the load applied to a specimen 6, the dynamometer element 9 with the strain sensitive filament formed therewith is suitably calibrated as by being progressively loaded in a materials testing machine and observing the corresponding variations in electrical resistance of the strain sensitive filament. The variation in electrical resistance of the strain sensitive filament 9 may be determined by a usual Wheatstone bridge in which the filament constitutes one arm and which is not shown herein as it is a well-known measuring circuit.

It is necessary in an impact test, due to the extremely rapid rate of application of load, to employ an indicating circuit which is instantaneous in its load indication. This is best accomplished by the use of an oscillograph in place of the usual galvanometer of a Wheatstone bridge.

A phenomenon inherent in my improved combination of a fine wire filament bonded throughout its effective length to a test specimen or body to be variably strained is that the filament may be stressed appreciably beyond its normal elastic limit or yield point and still faithfully maintain its predetermined strain sensitivity, this phenomenon occurring even during repetitive loading. "Normal" elastic limit, as used herein, is the elastic limit that the filament material would have if tested alone, free of bonding material and in the normal way of applying load only to the ends of a specimen. This ability to exceed the normal elastic limit allows the gauge to have a very much larger range of operation than would otherwise be the case and even though the elastic limit is not exceeded during use of the gauge still the principles that govern the action of the filament are present and these principles are helpful in maintaining a stable zero, eliminating hysteresis especially in materials that are particularly subject to it and of allowing accurate reproducible results to be obtained during either static or dynamic tests.

The phenomenon of being able to stress a completely bonded fine wire filament beyond its normal elastic limit while still retaining its predetermined strain sensitivity is also present even though the filament is in an initially untaut condition at the time of starting a test, that is the filament is not pre-stressed. A further result of employing an untaut filament is that it is dependent only upon the strain imposed upon it and is not dependent to any sensible degree directly upon the stress which is set up in the filament as a result of the strain. This causes the gauge to have the important property of far more dependability than where a filament is stretched taut and in which therefore the elastic properties of the filament may enter into the measurement as well as the presence of any accidental kinks or weak sections due to local reductions in cross-sections.

While various theories and explanations might be given for the phenomena and results referred to herein, still it is such characteristics or the fundamentals underlying or incident to such characteristics that have rendered it possible to provide a strain measuring gauge, and various applications thereof, of great practical value having a highly stable zero and freedom of hysteresis as well as having a very high degree of accuracy, sensitivity and dependability combined with a low initial cost and ease of application to specimens or test bodies of either simple or complicated form regardless of whether their test surfaces are flat or sharply curved. Notwithstanding such widely varying conditions of use the gauge can be readily positioned with the greatest of ease so that its filament extends in the direction of strain desired to be studied or measured. The filament by being bonded in cement throughout its effective length is firmly held so as to be extensible and contractible only in the direction of its length in response to the deformation of the test body. The filament is not subject to any detectable strain transmitted thereto at right angles to the filament axis.

The ability to accomplish certain of the desirable results herein referred to, as well as possible others, is believed to be related, at least in part, to the fact that a fine wire has an enormous bonding area in proportion to the cross-sectional area of the filament. For instance, for fine wires of the order herein preferably used, a one-inch length of filament one thousandth of an inch in diameter has a bonding area approximately 4000 times its cross-sectional area while a filament of approximately three thousandths of an inch in diameter has a bonding area of the approximate order of 1300, specifically 1333, times its cross-sectional area. This insures a very effective total bonding area of the filament compared to the cross-sectional area or strength of the filament thereby causing the cement to exercise control of great positiveness over the entire effective area of the filament. The cement thus functions not only as a support adapted to laterally engage the filament throughout its length but also produces the necessary adhesive bond for transmitting deformations of the test body fully to the filament.

It is seen that I have provided an extremely simple and rugged and yet highly sensitive, and accurate and responsive electrical strain sensitive means that is economical in construction and operation, is compact and thoroughly reliable in its ability to reproduce results without incurring the many disadvantages of the prior art strain sensitive arrangements.

It will of course be understood that various changes in details of construction and arrangement of parts may be made by those skilled in the art without departing from the spirit of the invention as set forth in the appended claims.

I claim:

1. An electrical strain sensitive apparatus for a body adapted to be variably strained, comprising a continuous solid filament of extensible and contractible electrical conducting material whose electrical resistance varies in accordance with said extension and contraction, and a support for said filament adhesively bonded to said body and to said filament throughout its effective length whereby deformations of the body are transmitted through the support to the filament to cause the latter to extend or contract in following fully the deformations of the body and correspondingly vary the electrical resistance of the filament.

2. An electrical strain gauge for measuring deformations of a test body as it is variably strained, comprising an extensible and compressible bonding medium adapted to be secured to said body so as fully to conform to the variations in strain thereof as the strain of said body is varied, and a continuous solid metallic filament of extensible and compressible electrical conducting material adapted to have its electrical resistance vary in accordance with variations in compression or tension strains developed therein, said filament being embedded throughout its effective length in said bonding medium and bonded thereto by adherence for fully transmitting to said filament the variation in either tension or compression strains of said body thereby to effect a corresponding variation in the strain of said filament so as to vary the electrical resistance of the filament by the resulting strains developed therein.

3. An electrical strain gauge for measuring deformations of a test body as it is variably strained comprising, a flexible extensible and contractible layer of bonding medium adapted to be secured to said body so as to conform fully to the contour of the surface thereof and yield and follow the deformations of said surface as the strain of said body is varied, and a flexible metallic filament of continuous solid extensible and contractible electrical conducting material whose electrical resistance varies in accordance with variations of strain developed therein, said filament being embedded throughout its effective length in said bonding medium and bonded thereto by adherence fully transmitting the deformation of said body and of said bonding medium to said filament and correspondingly varying the electrical resistance of said filament by the resulting strains developed therein.

4. A strain gauge for measuring deformations of a test body as it is variably strained, comprising a continuous metallic filament of solid electrical conducting material whose electrical resistance varies in accordance with changes in strain in the filament and said filament having a predetermined arrangement prior to being placed in use, and a supporting medium bonded to said filament throughout its effective length for maintaining said filament in its said predetermined arrangement, said supporting medium and filament forming a unit adapted to be adhesively bonded to the surface of said test body so that said entire effective length of the filament forms a completely unitary part of said body and is held by adherence for transmitting to said filament changes in deformation of the body and correspondingly varying the electrical resistance of said filament.

5. An electrical strain gauge for measuring changes in the deformation of a test body as it is variably strained, comprising a continuous and untaut metallic filament of solid electrical conducting material whose electrical resistance varies in accordance with changes in strain in the filament, and means for adhesively bonding said filament in its untaut condition throughout its effective length to said body so that said filament forms a completely unitary part of said body and is held thereto by adherence fully transmitting to said filament changes in the deformation of said body and correspondingly varying the electrical resistance of said filament.

6. An electrical strain gauge for measuring changes in the deformation of a test body as it is variably strained, comprising a continuous metallic filament of solid electrical conducting material whose electrical resistance varies in a predetermined manner in accordance with changes in strain in the filament, said filament being a fine wire of diameter that for a one inch length of the filament it has a surface area of the approximate order of at least 1300 times its cross-sectional area, and a bonding medium surrounding said filament and being adhesively bonded to said body and to said filament throughout its effective length so that the filament forms a completely unitary part of said body and is held thereto by adherence fully transmitting to said filament changes in the deformation of said body and correspondingly varying the electrical resistance of said filament in accordance with said predetermined manner.

7. An electrical strain gauge for measuring changes in the deformation of a test body as it is variably strained, comprising a continuous metallic filament of solid electrical conducting material whose electrical resistance varies in a predetermined manner in accordance with changes in strain in the filament, and an extensible and contractible bonding medium embedding said filament and adhesively bonding the filament throughout its effective length to said body so that the filament forms a completely unitary part thereof, the adhesive bonding effect of said bonding medium and the surface area of said filament as compared to its cross-section area being such that deformations of said body are adapted to be transmitted to said filament and repeatedly stress the filament beyond its normal elastic limit while the filament retains its said predetermined manner of resistance change.

8. An electrical strain gauge for measuring changes in the deformation of a test body as it is variably strained, comprising a continuous metallic filament of solid electrical conducting material extending back and forth in a series of substantially parallel lengths joined together at alternate ends and whose electrical resistance varies with strain in the filament whereby the electrical resistance of the successive parallel lengths accumulates in series, and a filament supporting medium bonded to said filament throughout its effective length for maintaining said parallel lengths in position and for forming a unit adapted to be adhesively bonded to the surface of said test body so that said filament forms a completely unitary part of said body held thereto by adherence for transmitting fully to said filament changes in the deformation of the body and correspondingly varying the electrical resistance of said filament.

9. An electrical strain gauge for measuring changes in the deformation of a test body as it is variably strained, comprising a continuous metallic filament of solid electrical conducting material extending back and forth in a series of substantially parallel lengths joined together at alternate ends and whose electrical resistance varies with strain in the filament whereby the electrical resistance of the successive parallel lengths accumulates in series, a thin and normally flat flexible member for supporting said parallel lengths in a substantially common plane, and a bonding medium for bonding said filament throughout its effective length to said flexible member for maintaining said parallel lengths in position and for forming a unit adapted to be adhesively bonded to the surface of said test body so that said filament forms a completely unitary part of said body and is held thereto by adherence for transmitting fully to said filament changes in the deformations of the body and correspondingly varying the electrical resistance of said filament.

10. An electrical strain gauge for measuring changes in the deformation of a test body as it is variably strained, comprising a continuous metallic filament of solid electrical conducting material extending back and forth in a series of substantially parallel lengths joined together at alternate ends and whose electrical resistance varies with strain in the filament whereby the electrical resistance of the successive lengths accumulates in series, non-conducting threads extending in a direction substantially at right angles to said parallel lengths of filament and interwoven therewith to form a mat for holding the parallel lengths of the filament in a predetermined relation, and said mat being adapted to be adhesively bonded to the surface of said test body throughout the effective length of said filament so that said filament forms a completely unitary part of said body held thereto by adherence for transmitting said filament changes in deformation of a body and correspondingly varying the electrical resistance of said filament.

EDWARD E. SIMMONS, Jr.

CERTIFICATE OF CORRECTION.

Patent No. 2,292,549.  August 11, 1942.

EDWARD E. SIMMONS, JR.

It is hereby certified that error appears in the printed specification of the above numbered patent requiring correction as follows: Page 1, first column, line 16, for "principal" read --principle--; lines 21 and 22, strike out the words "employing the principle"; and second column, line 43, for "measure in term" read --measured in terms--; page 2, first column, line 19, for "will" read --well--; page 4, first column, line 23, strike out "and" after the word and comma "sensitive," and insert the same after the comma and before "is" in line 26; and second column, line 55, claim 6, before the word "diameter" insert --such--; page 5, second column, line 35, claim 10, after "transmitting" insert --to--; and that the said Letters Patent should be read with this correction therein that the same may conform to the record of the case in the Patent Office.

Signed and sealed this 17th day of November 17, A. D. 1942.

(Seal)  Henry Van Arsdale,
Acting Commissioner of Patents.